US006744783B1

United States Patent
Tzeng (12) United States Patent
(10) Patent No.: US 6,744,783 B1
(45) Date of Patent: Jun. 1, 2004

(54) FRAME IDENTIFIER FOR IDENTIFYING LAYER 2 DATA PACKET TYPES FOR UPPER LAYER PACKET CLASSIFICATION IN A NETWORK SWITCH PORT

(75) Inventor: Shr-jie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 772 days.

(21) Appl. No.: 09/594,607

(22) Filed: Jun. 15, 2000

Related U.S. Application Data (63) Continuation-in-part of application No. 09/430,753, filed on Oct. 29, 1999, now Pat. No. 6,700,897.

(51) Int. Cl.$^7$ .................................. H04J 3/22
(52) U.S. Cl. ................. 370/469; 370/252; 370/392
(58) Field of Search ................. 370/252, 253, 370/254, 389, 392, 401, 411, 465, 466, 469; 709/230, 250

(56) References Cited

U.S. PATENT DOCUMENTS

| | | | |
|---|---|---|---|
| 5,953,335 A | | 9/1999 | Erimli et al. |
| 6,021,132 A | * | 2/2000 | Muller et al. ............ 370/412 |
| 6,453,360 B1 | * | 9/2002 | Muller et al. ............ 709/250 |

* cited by examiner

Primary Examiner—Hassan Kizou
Assistant Examiner—M. McLoughlin
(74) Attorney, Agent, or Firm—Manelli Denison & Selter PLLC; Leon R. Turkevich (57) ABSTRACT

A network switch, configured for performing layer 2 and layer 3 switching in an Ethernet (IEEE 802.3) network without blocking of incoming data packets, includes a network switch port having a filter (i.e., a packet classifier module) configured for evaluating an incoming data packet on an instantaneous basis. The filter performs simultaneous comparisons between the incoming data stream of the data packet and multiple templates configured for identifying respective data protocols. Each template is composed of a plurality of min terms, wherein each min term specifies a prescribed comparison operation within a selected data byte of the incoming data packet. The templates may be programmed by a user and stored in an internal min term memory. Moreover, the multiple simultaneous comparisons enable the network switch to perform layer 3 switching for 100 Mbps and gigabit networks without blocking in the network switch. The number of templates is minimized by comparing received bytes relative to the beginning of the layer 3 frame, determined by a frame identifier which determines the layer 2 header format that affects the beginning of the layer 3 frame.

13 Claims, 5 Drawing Sheets

FRAME IDENTIFIER FOR IDENTIFYING LAYER 2 DATA PACKET TYPES FOR UPPER LAYER PACKET CLASSIFICATION IN A NETWORK SWITCH PORT

CROSS REFERENCE TO RELATED APPLICATIONS

This application is a Continuation-in part of commonly-assigned, copending application Ser. No. 09/430,753, filed Oct. 29, 1999 now U.S. Pat. No. 6,700,897.

BACKGROUND OF THE INVENTION

1. Field of the Invention

The present invention relates to layer 2 and above switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). For example, layer 3 processing evaluation of frame data relative to the start position of the layer 3 header. The start position, however, will vary based on the protocol of the layer 2 header, since each layer 2 protocol results in a layer 2 header having a corresponding length. Hence, network administrators may be faced with duplicating layer 3 templates for each layer 2 protocol encountered in the network, substantially increasing the memory requirements for the network switch.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal buffering within the network switch that may otherwise affect latency of switched data packets.

There is also a need for an arrangement that enables a network switch to identifier layer 2 protocol for identification of a beginning of a layer 3 header for layer 3 and above processing.

These and other needs are attained by the present invention, where a network switch port includes a filter, also referred to as a packet classifier, configured for evaluating an incoming data packet on an instantaneous basis. The filter performs simultaneous comparisons between the incoming data stream of the data packet and multiple templates configured for identifying respective protocols. Each template is composed of a plurality of min terms, where each min term specifies a prescribed comparison operation with a selected data byte of the incoming data packet. The filter includes a layer 2 frame identifier module configured for determining a protocol of the received layer 2 header, and a min term controller configured for identifying a beginning of the layer 3 header based on the determined protocol of the layer 2 header. The min term controller accesses the min terms based on the ordering of the data bytes, such that the min terms that are used to compare the first data byte of the layer 3 header are first accessed for comparison with the first data byte as the first data byte is received; the min terms used to compare the second data byte of the layer 3 header are then accessed for comparison with the second data byte as the second data byte is received. Hence, the filter simultaneously compares the min terms that correspond to the selected byte of the incoming data packet as the selected byte is received by the network switch port. The results of the comparisons between the min terms and the selected data bytes of the incoming data stream are evaluated by an equation core within the filter, which determines comparison results for the templates and outputs a tag to the switching core, providing the switching core with information on how to process the received data packet. Hence, the switching core has sufficient time to perform layer 2 or layer 3 switching of the received data packet in a non-blocking manner in a high-speed data network.

One aspect of the present invention provides a method of evaluating an incoming data packet at a network switch port. The method includes determining a layer 2 header format of the incoming data packet, and identifying a beginning of a layer 3 header in the incoming data packet based on the determined layer 2 header format. The method also includes simultaneously comparing selected bytes, relative to the beginning of the layer 3 header, to min terms for identification of prescribed user-selected attributes based on determined matching min terms. The determination of the layer 2 header format and identification of the beginning of the layer 3 header minimizes the number min terms that need to be stored for identification of the prescribed user-selected attributes. Hence, a single set of min terms can be used to perform evaluations of the incoming data packet, regardless of the layer 2 header format.

Another aspect of the present invention provides a network switch port filter configured for evaluating an incoming data packet. The network switch port filter includes a min term memory configured for storing min term values, each min term value stored based on a location of a corresponding selected byte of the incoming datapacket for comparison relative to a beginning of a layer 3 header, an evaluation portion specifying a corresponding comparison operation, and a equation identifier field that specifies templates that use the corresponding min term. The network switch port filter also includes a frame type identifier configured for identifying a format of a layer 2 header of the incoming data packet for location of the beginning of the layer 3 header, and a min term generator configured for simultaneously comparing a received byte of the incoming data packet with the min terms that correspond to the received byte and generating respective min term comparison results based on the identified format.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
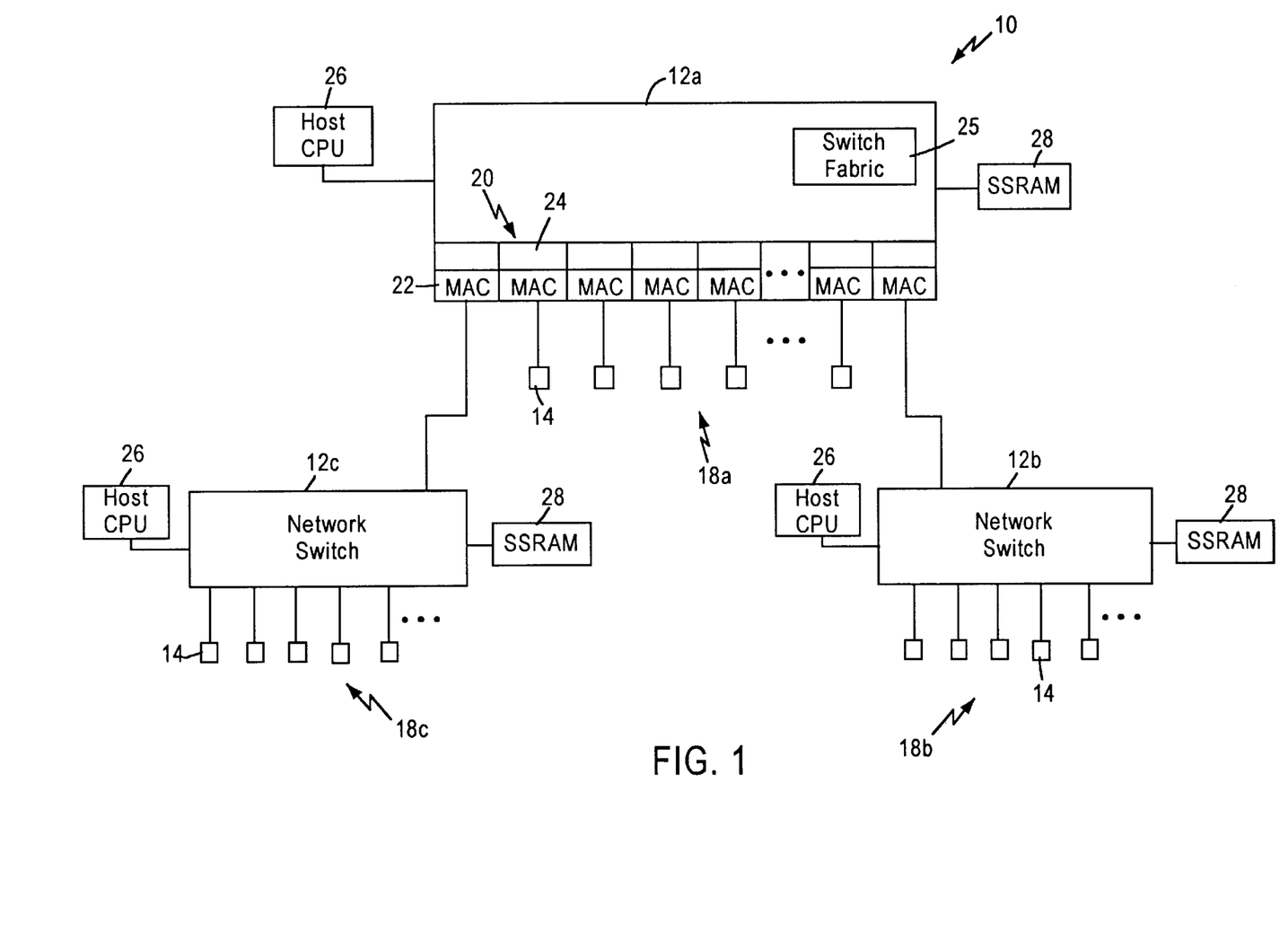
FIG. 1 is a block diagram of a packet switched network including multiple network switches for switching data packets between respective subnetworks according to an embodiment of the present invention.
Figure 2:
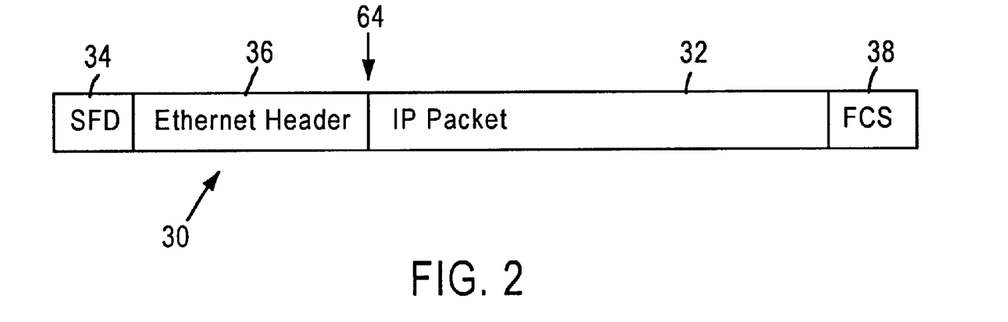
FIG. 2 is a diagram illustrating a conventional layer 2 Ethernet-type data packet carrying a layer 3 Internet protocol (IP) packet.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Figure 3:
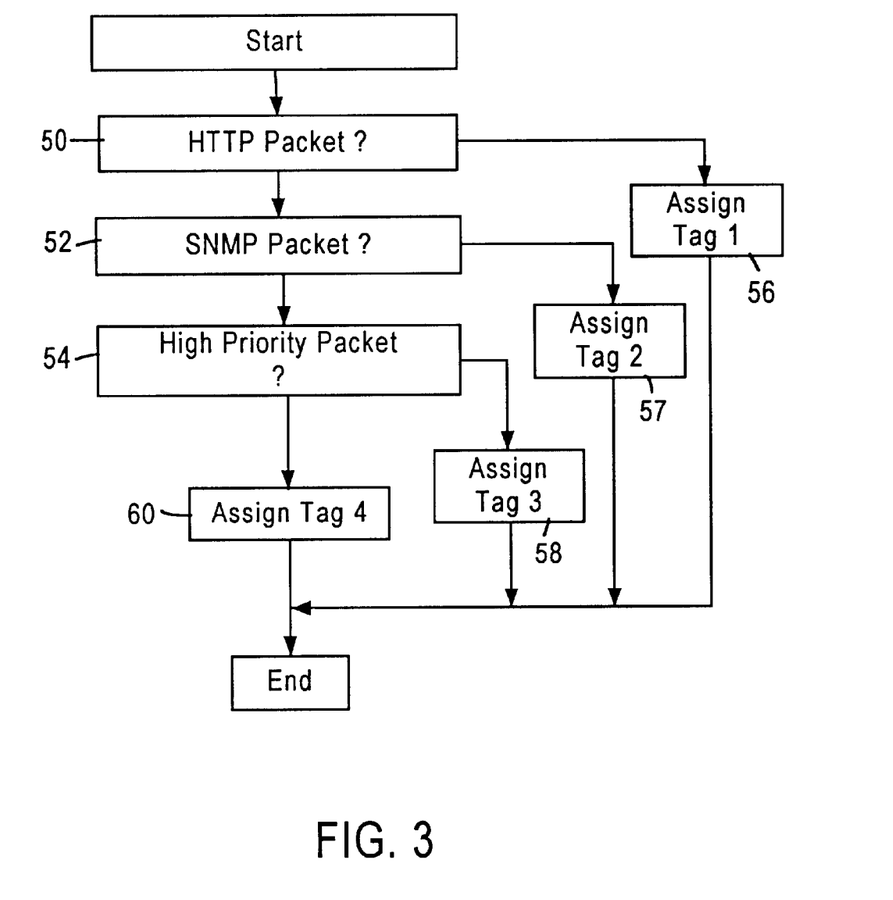
FIG. 3 is a flow diagram illustrating a conventional (prior art) method of evaluating an IP packet.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet. particular, the sequential nature of the decision process in FIG. 3 would result in undue latency for the incoming data packet.

According to the disclosed embodiment, the packet classifier module 24 of FIG. 1 is configured for multiple simultaneous comparisons between the incoming data stream and templates that identify the data format of the incoming data stream. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a high-priority packet (e.g., video, or voice, etc.).

Figure 4:
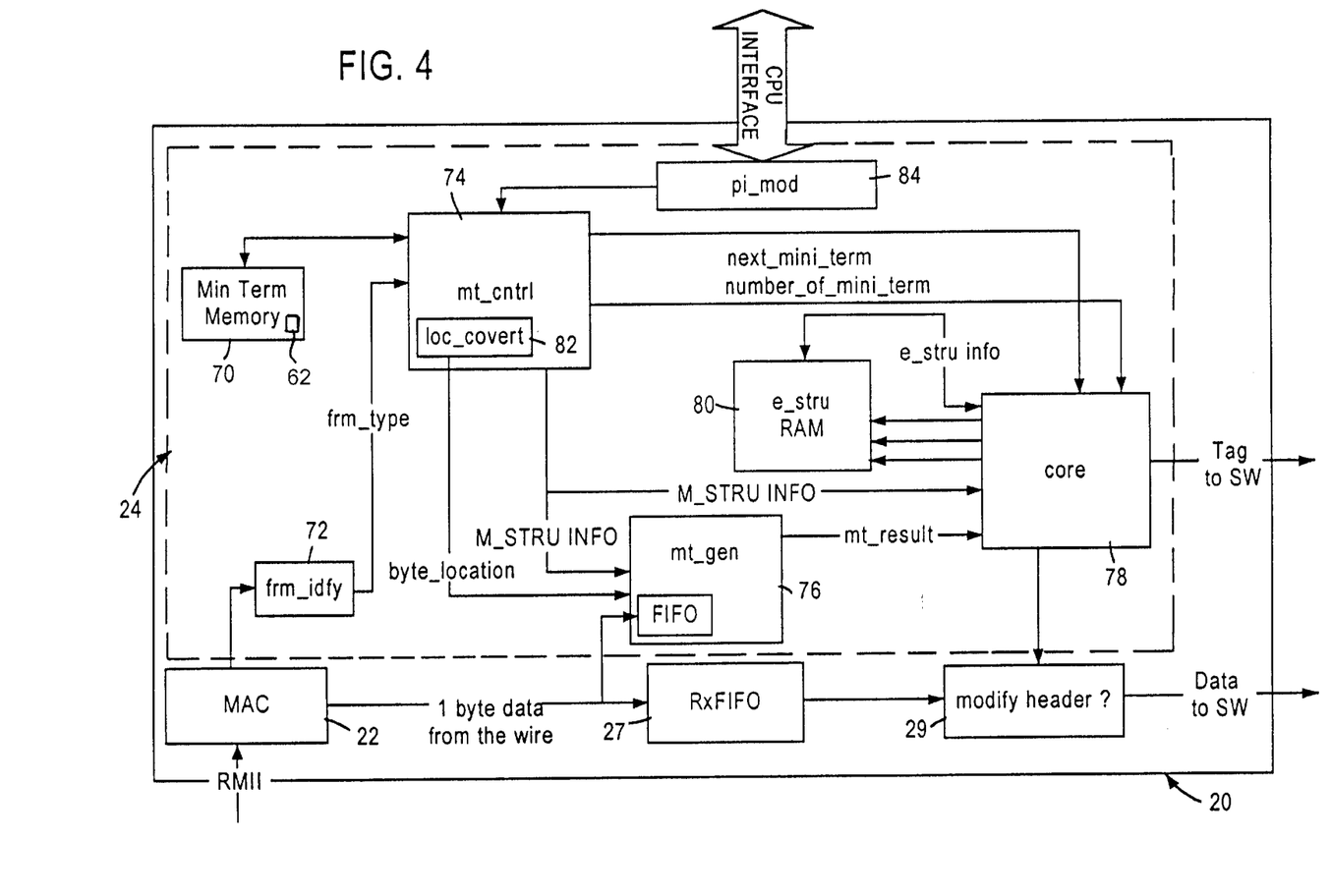
FIG. 4 is a block diagram illustrating the network switch port of FIG. 1, including the network switch port filter, according to an embodiment of the present invention.

FIG. 4 is a block diagram illustrating the packet classifier module 24 according to an embodiment of the present invention. As shown in FIG. 4, the network switch port 20 includes a MAC 22, a receive FIFO buffer 27, a header modifier 29, and the packet classifier module 24. The packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received. Specifically, the packet classifier module 24 simultaneously compares the incoming data packet with a plurality of templates configured for identifying respective data formats. The packet classifier module 24, based on the comparison between the incoming data packet and the plurality of templates, identifies an equation to be executed that specifies the tag to be supplied to the switch fabric 25.

Specifically, the packet classifier module 24 generates a comparison result that identifies the incoming data packet by detecting at least one matched template from a plurality of templates. The packet classifier module 24 then identifies which of the equations includes the matched template, and generates the tag specified by the equation.

The min terms are arranged within associated templates in a prescribed order that corresponds to the relative position of a data byte in the incoming data stream. Hence, the use of templates 62 having min terms in an order based on the relative position of a data byte in the incoming data stream enables multiple simultaneous comparisons between the incoming data stream and min terms. Hence, an incoming data packet can be compared to multiple templates to determine not only the data format of the incoming data packet, but also what action needs to be performed by the switch fabric 25.

Figure 5:
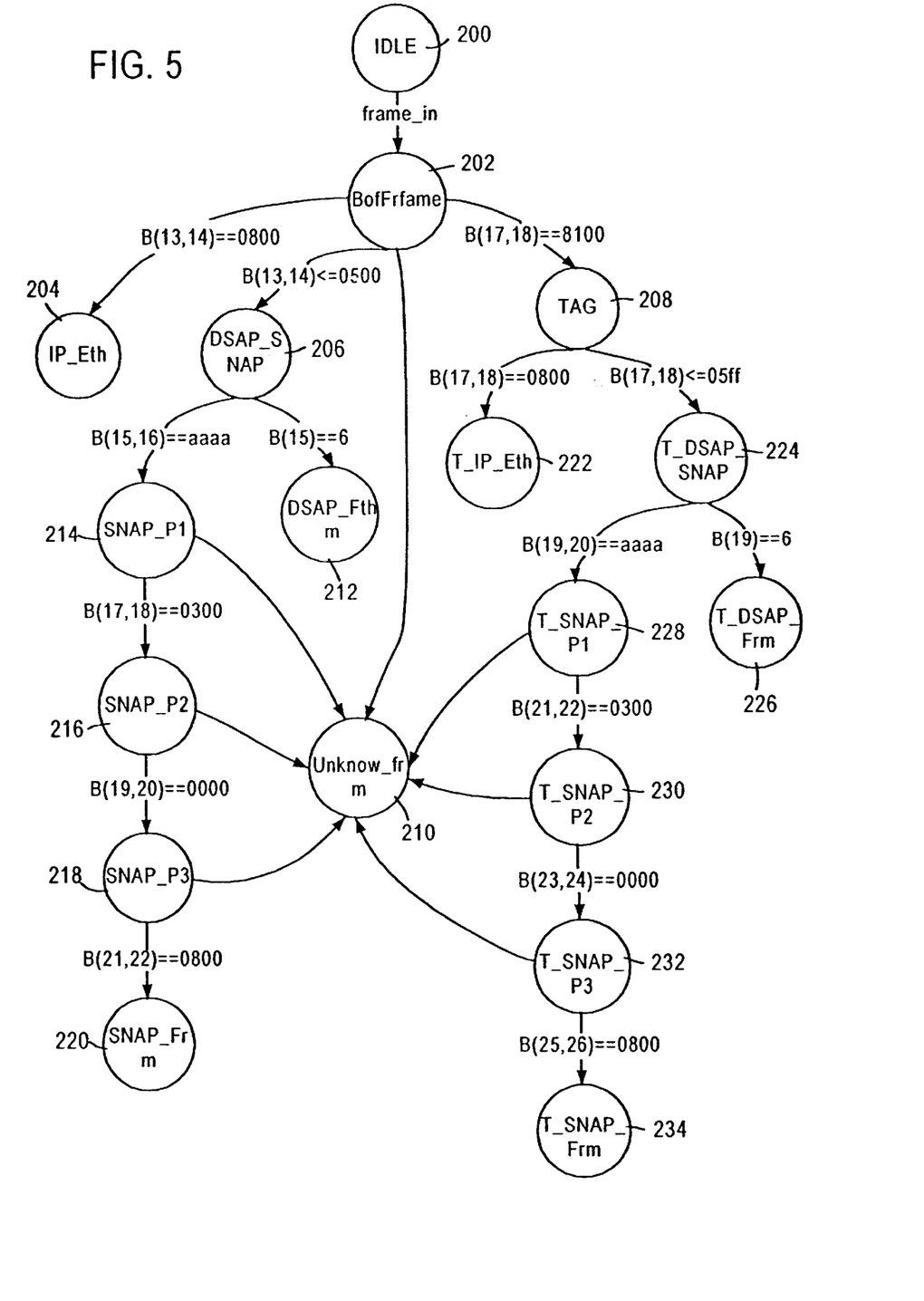
FIG. 5 is a diagram illustrating the identification of layer 2 header formats by the frame identifier of FIG. 4.
Figure 6:
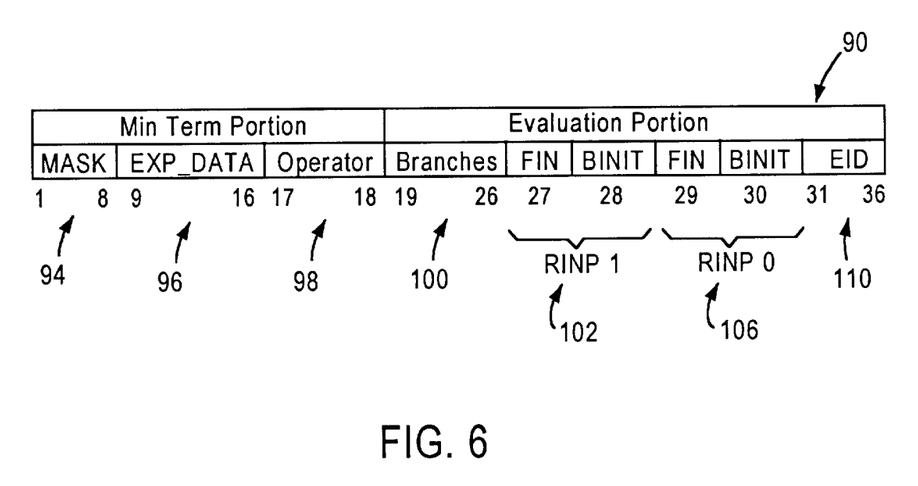
FIG. 6 is a diagram illustrating a table entry of a min term in the min term memory of FIG. 4 according to an embodiment of the present invention.

FIG. 4 is a block diagram illustrating in detail the packet classifier 24 of FIG. 1. As shown in FIG. 4, the packet classifier 24, also referred to as a network switch port filter, includes a min term memory 70 for storing the min term values as illustrated in FIG. 6, described below. The packet classifier 24 also includes a frame identifier 72 configured for identifying the type of layer 2 frame being received. As described below with respect to FIG. 5, identifying the type of layer 2 frame being received (e.g., Ethernet, IEEE 802.3, etc.) enables identification of the start position 64 of the IP packet 32 within the layer 2 packet 30. The packet classifier 24 also includes a min term controller 74, a min term generator 76, an equation core 78, and an evaluation results memory 80. A processor interface module (pi_mod) 82 is used for transferring the generated min terms from the host CPU 26 into the min term memory 70.

The min term controller 74 is configured for fetching the min terms from the min term memory 70 corresponding to a selected byte of the IP frame 32. The min term controller 74 also includes a location converter configured for specifying the actual byte location (byte_location) of the start point 64 in response to receiving a frame type (frm_type) signal from the frame identifier 72 that specifies the type of layer 2 frame. Hence, the min term controller 74, in response to detecting the beginning of the IP packet, fetches all the min terms that are to be compared with the first byte (B1) of the IP packet 32. The min term controller 74 then forwards the min term values (M_STRU INFO) to the min term generator 76 and the equation core 78.

The min term generator 76 performs the actual min term comparisons between the min terms fetched by the min term controller and the selected byte of the incoming data stream. For example, the min term generator 76 simultaneously compares the incoming data byte with the min terms and provides the min term comparison results (mt_result) to the equation core 78. During the next comparison cycle, the min term generator 76 simultaneously compares the next incoming data byte with the associated min terms. According to the disclosed embodiment, the min term generator is configured for simultaneously comparing the incoming data stream to up to eight min terms.

The equation core 78 is configured for generating a frame tag based on the min term comparison results received from the min term generator 76, relative to the relevant templates 62. The frame tag identifies the nature of the incoming data packet, as well as the action that needs to be performed by the switch fabric 25.

FIG. 6 is a diagram illustrating the data format of the min term structure in the min term memory 70. According to the disclosed embodiment, the min terms are stored in the min term memory 70 in an order corresponding to the relative position of the data byte to be compared. Hence, all min terms that are to be compared to the first data byte are stored together in a first part of the min term memory, followed by min terms to be compared with the second data byte, etc.

Alternatively, the min terms may be stored in an order based on relevant information within the IP header, as well as the relative position of the data byte to be compared. Hence, the min terms may be stored in an order for comparing the sequence of data bytes providing the source IP address, destination IP address, and source and source and destination ports; in this case, non-relevant data bytes at the beginning of the IP frame would not have associated min terms stored at the beginning of the min term memory 70, further improving the efficiency of the min term memory 70.

Each table entry 90 includes a min term portion and an evaluation portion. The min term portion includes a mask field (MASK) 94, an expected data field (EXP_DATA) 96, and an operator field (OPERATOR) 98. Based on the position of the table entry 90 in the min term memory 70, the min term controller 74 is able to determine which byte of the IP packet 32 that needs to be compared with the corresponding min term, relative to the beginning 64 of the IP packet. The mask field 94 is a mask that is used by the min term generator 76 in performing comparisons; if the mask has a bit set to 1, the value is compared, and if the mask value has zeros in the field, the comparison is a don't care. The expected data field 96 specifies the expected data to be compared with the relevant data byte of the IP packet 32. The operator field 98 specifies the type of comparison to be performed by the min term generator, for example: less than, less than or equal to, equal to, greater than, greater than or equal to, and not equal to.

The evaluation portion includes a branches portion 100, a response portion (RINP1) 102 for the case where the comparison of the min term portion is true, a second response portion (RINP0) 106 for the case where the comparison of the min term portion is false, and an equation identifier 110. The branches portion 100 specifies the order of the OR term in the equation; for example, the min term M1 as shown in FIGS. 5 and 6 would have its branches portion set to 0000 1111, indicating that the first four branches of the equation specified in the equation identifier field 110 are to include the corresponding min term. The use of eight bits for the branches portion assumes that there are a maximum of eight branches in any given equation.

The response portion 102 specifies the operation to be performed if the min term portion is evaluated as true relative to the compared data byte. In particular, the finish bit (FIN) is set to one if the results of the equation is determined if the min term result is true; the back to initial (BINIT) is set to one if the evaluation process should return to the initial state (init) if the min term result is true. For example, in the case of min term M1, the FIN bit and the BINIT bit of RINP1 are set to zero, since additional comparisons are needed if the min term result is true. In the case of min terms M5, M6, M7, and M8, the FIN bit of RINP1 is set to one, since a comparison result of "true" results in the end of the evaluation.

The response portion 106 specifies the operation to be performed if the min term portion is evaluated as false relative to the compared data byte. In particular, the finish bit (FIN) is set to one if the results of the equation is determined if the min term result is false; the back to initial (BINIT) is set to one if the evaluation process should return to the initial state (init) if the min term result is false. For example, in the case of min term M1, the FIN bit is set to zero and the BINIT bit of RINP1 is set to one, such that the equation would return to the INIT state if the min term result was false.

The equation identifier field 110 identifies the equation (or template if there is only one template in an equation) that the min term corresponds to.

Hence, the equation core 78 determines whether any specified equation has a template 62 that matches the incoming data stream. Based on the multiple simultaneous comparisons of the incoming data stream with the multiple templates 62, the equation core 78 can identify a matching equation, and generate the appropriate tag corresponding to the matched equation for help it to the switching fabric 25. If desired, the core 78 by also output a command to the header modifier 29 to modify the layer 2 header, the layer 3 header, or both, before transferring the data to the switch.

FIG. 5 is a diagram illustrating the operation of the frame identifier 72 according to an embodiment of the present invention. The frame identifier 72, illustrated as a state machine, begins in an idle state 200, and moves to a beginning of frame state 202 in response to detecting a beginning of frame signal from the MAC 22. The frame identifier 72 then enters different states, depending on the value of the 13th and 14th byte of the received layer 2 header. For example, the frame identifier 72 determines in state 204 that the layer 2 header is an IEEE 802.3 header that supports transport of Internet protocol headers based on detecting that the 13th and 14th bytes of the layer 2 header equal "0800" (hexadecimal). If the frame identifier 72 determines that the 13th and 14th bytes have a value less than or equal to "0500", the frame identifier 72 moves to state 206. If the 13th and 14th bytes of the layer 2 header equal "8100", the frame identifier 72 moves to state 208 indicating the presence of a tagged frame, else moves to the unknown frame state 210 and outputs an error signal.

State 206 indicates that the layer 2 header may include an untagged Sub Network Access Protocol (SNAP) header, found in legacy IBM servers, or a Destination Service Access Point (DSAP) header for non-IP protocols (e.g., Novell IPX, AppleTalk, LAN manager, X. 25, etc.). If the frame identifier 72 determines that the 15th byte has a value of "6", the frame identifier 72 enters a DSAP frame state 212 and signals to the min term controller 74 the determined frame type. Similarly, the frame identifier 72 evaluates bytes 15 through 22 of the received layer 2 header in states 214,216,218, and 220 to determine whether the layer 2 header includes an untagged SNAP header (indicated by state 220), or and unknown frame as indicated by state 210.

State 208 indicates that the layer 2 header is a tag frame. If bytes 17 and 18 of the tagged layer 2 frame equal "0800", the frame identifier 72 determines in state 222 that the layer 2 frame is a tag Ethernet frame capable of turning an IP header. However if bytes 17 and 18 of the layer 2 frame have a value less than "05ff", the frame identifier 72 moves to state 224 to determine whether the tagged layer 2 header is a tagged SNAP frame (state 234), a tagged DSAP frame (state 232), or an unknown frame (state 210). If byte 19 equals "6", than the frame identifier 72 identifies the layer 2 header as a tagged DSAP frame in state 226. Otherwise, the frame identifier 72 checks bytes 19 through 26 in states 228,230, and 232 to determine whether the received layer 2 frame is a tagged SNAP frame in state 234 or an unknown frame in state 210.

According to the disclosed embodiment, a network switch port includes a filter capable of performing multiple simultaneous comparisons between the incoming data stream of the data packet and multiple templates configured for identifying a corresponding protocol. Since the packet classifier module 24 can process any of the bytes of the IP frame 32, the packet classifier module 24 can interpret all the header information in the IP packet 32 from layer 3 up to layers 7 protocols. Moreover, the multiple simultaneous comparisons enables the network switch 12 to perform layer 3 switching for 100 Mbps and gigabit networks without blocking in the network switch. Finally, the multiple simultaneous comparisons in the order in which the data is received enables real time comparisons to be performed, as opposed to alternative schemes such as programmable logic arrays (PLAs), which would require the entire header to be received before processing can begin.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of evaluating an incoming data packet at a network switch port, the method comprising:

determining a layer 2 header format of the incoming data packet;

identifying a beginning of a layer 3 header in the incoming data packet based on the determined layer 2 header format; and simultaneously comparing selected bytes, relative to the beginning of the layer 3 header, to min terms for identification of prescribed user-selected attributes based on determined matching min terms.

2. The method of claim 1, wherein the simultaneously comparing step includes:

loading the min terms corresponding to a first of the data bytes relative to the beginning of the layer 3 header into a min term generator;

comparing in parallel the min terms loaded in the min term generator with the first of the data bytes; and outputting comparison results for the min terms loaded in the min term generator to an evaluation core.

3. The method of claim 1, further comprising outputting a frame tag, based on the comparison result, to a switch fabric configured for selectively switching the incoming data packet based on the corresponding frame tag.

4. The method of claim 1, wherein the determining step includes identifying whether the layer 2 header format includes one of an Internet-Protocol (IP)-supported Ethernet format, a Sub Network Access Protocol (SNAP) format, and a Destination Service Access Point (DSAP) format.

5. The method of claim 4, wherein the identifying step includes identifying whether the layer 2 header format includes a tagged format.

6. The method of claim 1, wherein the determining step includes identifying whether the layer 2 header format includes a tagged format.

7. The method of claim 6, wherein the determining step includes identifying whether the layer 2 header format includes one of an Internet-Protocol (IP)-supported Ethernet format, a Sub Network Access Protocol (SNAP) format, and a Destination Service Access Point (DSAP) format.

8. A network switch port filter configured for evaluating an incoming data packet, comprising:

a min term memory configured for storing min term values, each min term value stored based on a location of a corresponding selected byte of the incoming data packet for comparison relative to a beginning of a layer 3 header, an evaluation portion specifying a corresponding comparison operation, and a equation identifier field that specifies templates that use the corresponding min term;

a frame type identifier configured for identifying a format of a layer 2 header of the incoming data packet for location of the beginning of the layer 3 header;

a min term generator configured for simultaneously comparing a received byte of the incoming data packet with the min terms that correspond to the received byte and generating respective min term comparison results based on the identified format.

9. The filter of claim 8, further comprising an equation core configured for generating a frame tag identifying the incoming data packet based on the min term comparison results relative to the templates.

10. The filter of claim 8, wherein the frame type identifier is configured for identifying whether the layer 2 header format includes a tagged format.

11. The filter of claim 8, wherein the frame type identifier is configured for identifying whether the layer 2 header format includes one of an Internet-Protocol (IP)-supported Ethernet format, a Sub Network Access Protocol (SNAP) format, and a Destination Service Access Point (DSAP) format.

12. The method of claim 1, wherein the network switch port is of an integrated multiport network switch.

13. The filter of claim 8, wherein the filter is of an integrated multiport network switch.

* * * * *